United States Patent [19]

Hillesheim et al.

[11] Patent Number: 4,623,410

[45] Date of Patent: Nov. 18, 1986

[54] ARROW MASTER-STRAIGHTENER/CONDITIONER

[76] Inventors: Axel P. Hillesheim, 707 Winford Ave., Green Bay, Wis. 54303; Andrew M. Bray, 3244 Maple Grove, Suamico, Wis. 54173

[21] Appl. No.: 564,395

[22] Filed: Dec. 22, 1983

[51] Int. Cl.[4] .............................................. C05B 7/00
[52] U.S. Cl. ......................................... 156/64; 72/34; 156/294; 156/378; 269/38
[58] Field of Search ................ 156/378, 64, 293, 294; 269/38; 72/34

[56] References Cited

U.S. PATENT DOCUMENTS

| | | | |
|---|---|---|---|
| 1,499,100 | 6/1924 | Ekstrom | 72/34 |
| 2,876,822 | 3/1959 | Groves | 72/34 |
| 3,846,998 | 11/1974 | Lock | 72/34 |
| 3,859,728 | 1/1975 | Shutt | 269/38 X |
| 4,203,308 | 5/1980 | Davis | 72/34 |

Primary Examiner—David Simmons

[57] ABSTRACT

The invention disclosed teaches an arrow straightening machine which includes a nock or head alignment bearing attachment which allows for correction of any eccentricity or misaligmnent between the nock or head and the arrow shaft. The method discloses adhesively bonding the nock or head to the arrow shaft using the attachment device to align while the adhesive is in the unset condition.

12 Claims, 5 Drawing Figures

ARROW MASTER-STRAIGHTENER/CONDITIONER

The invention disclosed in this application relates to arrow straightening and the device described would be used by anyone connected to the shooting of an arrow from a bow or servicing arrows. The type of arrow would be aluminum but should not be limited to that material because the attaching of nocks and heads can be done to any type of arrow material like wood, graphite, plastic, etc. Historically, only aluminum arrows have been straightened by the use of an arrow straightener.

Heretofore, numerous shaft straightening devices have been available in the market place. Each of them with its own means of indicating an eccentricity and a means of elastically deforming and returning the arrow to a striaght condition by way of reverse tension and pressure. Some straighteners used fixed support bearing locations, others do not. It should be noted that graphite, wooden, plastic and some other material arrows are not generally straightened by this means.

Even the most notable of tubing and arrow manufacturers make no provision for accurately attaching nocks and heads to the basic arrow. That is the reason this device was conceived. Current means of attaching nocks and heads call for visual checks for eccentricity. Although we have found that practice to be fairly accurate we have also found the performance of visually inspected arrows to be somewhat unreliable and inconsistent. The straightener we have devised is totally effective with respect to the complete arrow with all components in place. We must admit that the accuracy of the components will have a bearing on the overall accuracy of the arrow. That is, if there is any irregularity or eccentricity in the component being attached the overall accuracy of the arrow flight could be affected. Insofar as the parts are all mass produced using mechanical dies, molds and precision machinery one must assume that the parts have been and are made within acceptable limits. We have found arrows assembled as we prescribe to be shot with repeatable and outstanding results.

As indicated earlier numerous straighteners are available on the market with some types approaching ours in straightening capabilites only. The one coming closest is the one manufactured by the Arten Co. of Scotland. It features an extruded dovetail base but falls short in application because the center support is fixed and does not allow for universal usage of the whole span. Length of feathers or vanes can seriously limit the available work space. Other American made devices exhibit similar and even more restrictive features.

A BRIEF DESCRIPTION OF THE DRAWINGS

Referring to the drawings.

Figure 2:
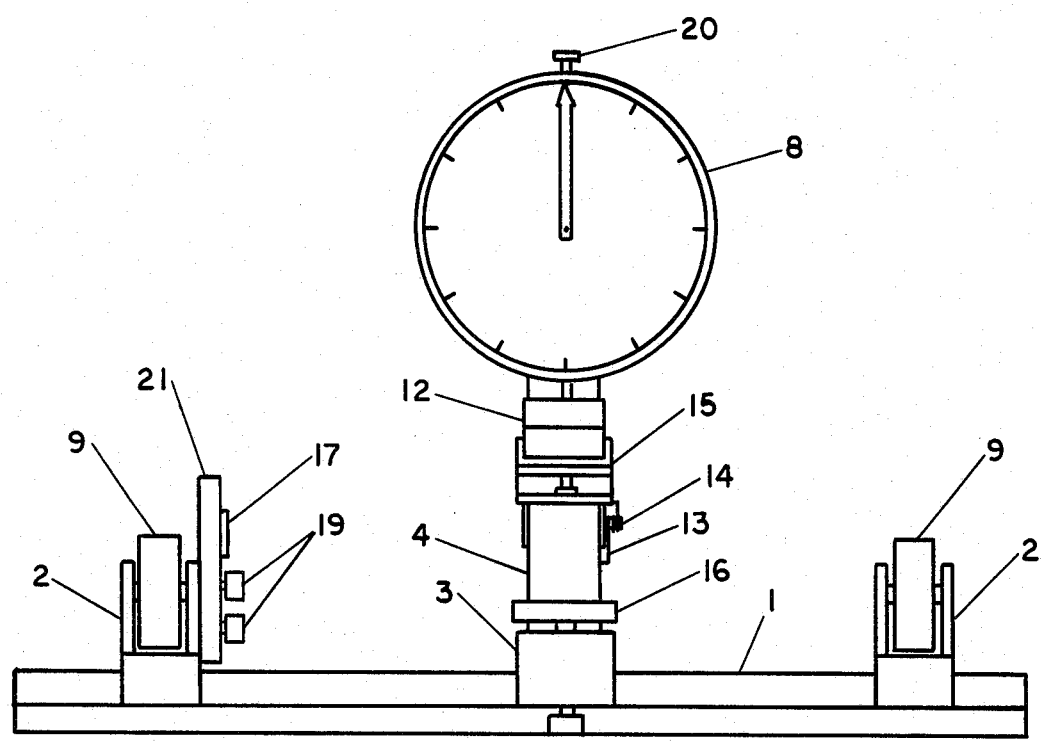
FIG. 2 is a side view from the front of the straightener illustrating the items indicated in FIG. 1.
Figure 3:
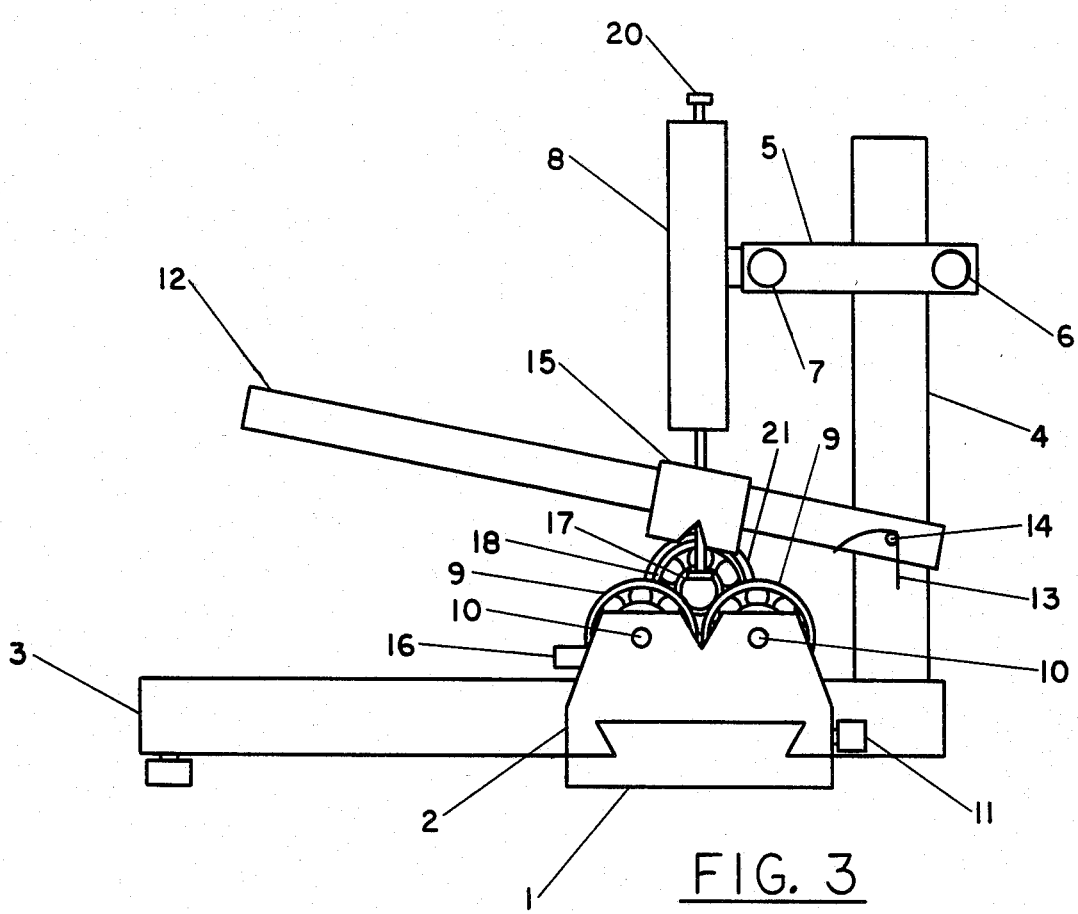

FIG. 3 is an end view of the end bearing support and the relationship of the key elements. Because the number of items that must be shown in the Figure, the nock/head holder is not shown here. The holder is shown in FIGS. 1 and 2, in a position that would be most difficult to see from this end.

Figure 4:
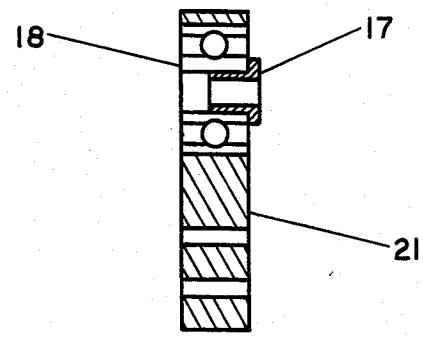

FIG. 4 is a blown up cross section of the nock/head holder showing the relative location of the heart of the invention. This figure and the discussion following should not preclude other options like two separate size nock/head bearings and supports or their equivalent.

Figure 5:
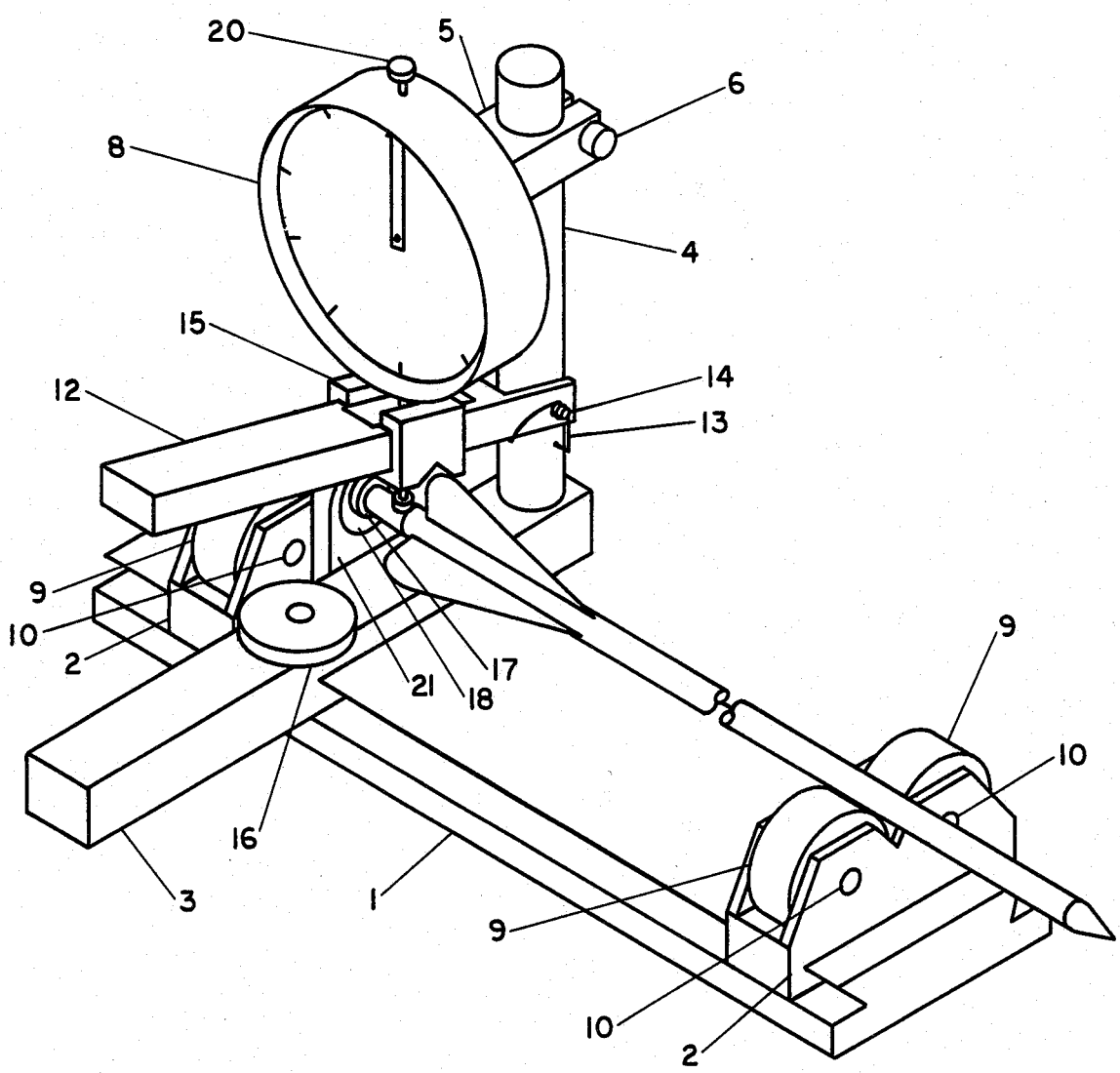

FIG. 5 is an isometric view of the mechanism illustrating the nock/head attachment in place with an arrow in position for nock alignment. Other features of the invention will be brought out in the following description, drawings and claims.

Figure 1:
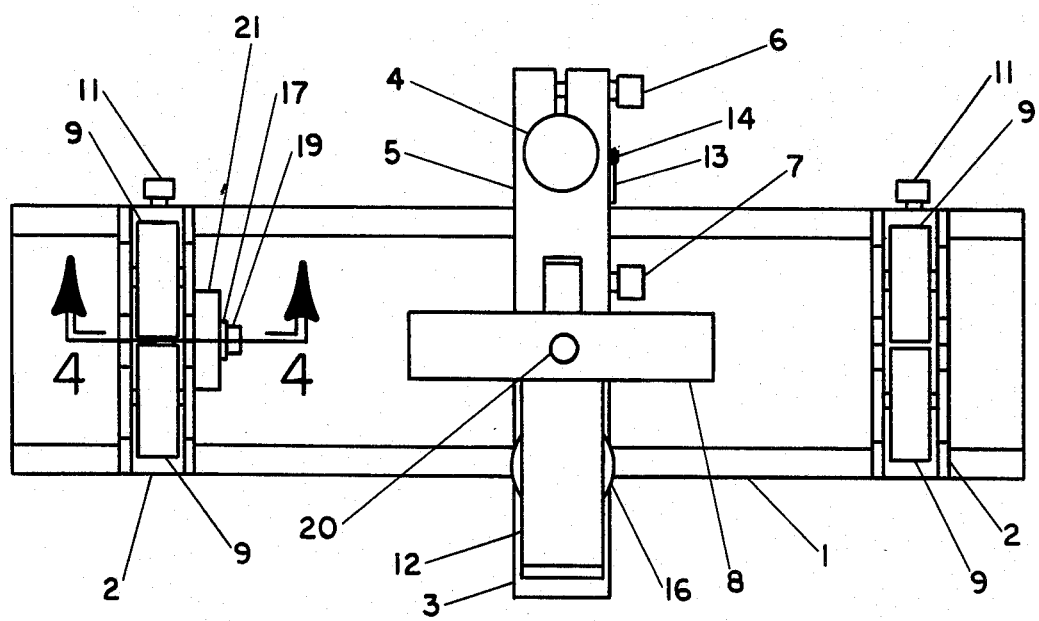
FIG. 1 is a top view of the straightener indicating relative placement of bearing and indicator supports, flexing bar and nock/head support.

Referring to FIG. 1, 1 is the base. The base, 1, would be an extrusion but should not be limited to that as it could be machined from solid plate. The base would be sized to meet the required length and be as economical as possible. It is shown here with drilled and countersunk holes for flat head screws to bolt to a table top. The table or bench top could be inclined about 15° to make the reading of the indicator a little more convenient than a straight up and down indicator. The base would have a dovetail shape or equivalent extruded or machined into it to accept the bearing supports, 2, and make lateral adjustment easy. The bearing supports, 2, and indicator support, 3, should run freely on the base. The bearing support, 2, and indicator support, 3, positions would be set by thumbscrews, 11. The thumbscrew, 11, threaded through the bearing or indicator support could contact the base directly or through some intermediary material like lead or plastic to avoid marring the base material. The bearing support, 2, would hold two bearings each, 9, and two support pins, 10, as shown on the right end bearing support. The purpose of the bearing, 9, is to provide a steady support for each and any diameter arrow but should not be limited to bearing type supports for the arrow. Fixed points or V blocks would be acceptable. Bearings are shown because they facilitate the arrow rotation during straightening. The eccentricity or class of the bearing is a consideration in the selection of suitable bearings. Shown on the left bearing support is the heart and major portion of the invention. Bearing support, 21, is the key. In it we have the bearing selections that allow us to attach and align nocks and heads accurately. The block itself, 21, is affixed to the bearing block by any suitable means and in this case is shown using two small thumbscrews, 19, in FIGS. 1 thru 4. Bearing support, 21, could also employ a single thumbscrew or shoulder bolt with detented ball and spring as shown in FIG. 5. The block is semi-permanent so it can be removed or rotated out of the way so the block bearings, 9, can be used while supporting and straightening the shaft. When checking nock and head alignment, once the bearing support, 21, is in place, a nock may be cemented to the arrow in the customary fashion. Before the cement has completely set or immediately after rotating the shaft in the moist nock until it feels hard to rotate, the nock is placed into bearing, 18, or a shouldered bushing, 17. The indicator support is relocated to any diameter near the nock while the arrow is subsequently rotated 360 plus degrees. Any eccentricity of nock alignment regardless of arrow diameter is detected on the indicator and the necessary correction is made while the cement is slightly stiffer than tacky. A similar procedure can be followed for all types of field heads. The reason we use the shouldered bushing, 17, is that the differences in sizes between some target nocks and some field diameter nocks used for hunting is so great two different bearing ID's are necessary. The shouldered bushing makes for less total cost while serving the same purpose.

The procedure for installing and inspecting field heads should be elaborated on a bit. Normally the arrow threaded inserts are placed in the arrow long before the head is inserted. This is in part due to the fact that many arrows are shot with the conventional target head in place long before the hunting head is used. Here it is very easy to have excessive eccentricity because of the manner in which the head is installed in the insert and its inherent parallelism. To properly align the head after it is assembled, simply install its designed number of blades into bearing, 18, or shouldered bushing, 17, mounted on left bearing support, then rotate arrow and head 360° while reading the indicator placed near the head. To make corrections in alignment one will have to heat lightly about the first inch of arrow to soften the insert's hot melt type cement. One should be careful not to overheat and damage the integrity of the shaft material. If materials other than aluminum shafting is used, follow much the same procedure as used when affixing the nocks. Here again the closer you locate the indicator to the head the better the chance of finding head misalignment and thus making the required correction. Note in both instances one should start with a true shaft.

The center item in FIG. 1 is the indicator support, 3, that constitutes the dovetailed base for the indicator/pressure bar. It is free to slide to an infinite number of positions of the base, 1, and is engaged or locked in that position by the thumbscrew, 16, or equivalent. The support post, 4, accepts the indicator support bracket, 5, which in turn supports the indicator, 8. In this figure we have elected to disregard the bending bar, 12, and bushing, 15. The height of the indicator is set by screws, 6 and 7. The bracket need not have slots and threaded halves. They could be threaded holes and merely exert pressure on support post.

FIG. 2 is a side view of same with little to learn from it except for pressure/bending bar, 12, and arrow force bushing, 15. Bushing shown is a nylon type material cast to a shape that encircles bar and provides slip type surface for arrow. The indicator, 8, is shown with its parts. The vertical extension is used to bear on the arrow while aligning nocks and heads. Bending bar, 12, is returned to the up position by means of torsion spring, 13, shown in FIGS. 1 and 3.

FIG. 3 is an end view of the apparatus that does not show the nock and head straightening apparatus because of its location with respect to the arrow support bearings. Item 2 is the dovetailed, extruded or machined bearing support and housing. Item 11 is the thumbscrew used to secure the bearing housing in the desired location. Item 10 is the bearing shaft for the bearings, 9. This Figure shows a side view of item 3 the support for indicator post, 4. It is infinitely adjustable on the base and is secured by thumbscrew, 16, from FIGS. 1 and 2. Item 12 is the straightening bar and is attached to support post, 4, by pin, 14. On the straightening bar, 12, is located a force bushing, 15, of suitable material for bending the aluminum. To return the straightening bar (arm) to the up position a torsion spring, 13, is used. In this manner, arrows can be more readily inserted into the apparatus with little or no bar interference. Item 5 is the indicator support bracket. It is secured to the support post, 5, by a locking bolt, 6, which clamps bracket to post. The indicator, 8, is secured in place by locking bolt, 7. The indicator, 8, is in 0.001" or 0.0005" graduations but could be any appropriate scale. Item 20 is typically an integral part of indicator, 8, and functions to measure the eccentricity of the arrow and serves as a means of correcting nock and head alignment.

By sliding either bearing housing, 2, or center support 3, one can arrive at an infinite number of relative locations so necessary for attaching nocks and heads in addition to the normal routine of straightening long and short radius bends in arrow shafting. The infinite variability is also an asset because of feather or vane placement on shafts. All other straighteners are quite restrictive in that respect. The Arten straightener has a fixed indicator position support, 3, and is therefore quite limited in use. (With our arrangement, even outboard location of the center support, 3, is possible with respect to the bearing housing, 2. Nocks may be aligned in that relative position checking highs and lows on both nock profiles. Nocks, in the vicinity of the string set have a non uniform cross section having two different concentric widths. Nocks may be aligned in that relative position checking highs and lows on both nock profiles. When a difference in indicator reading is noted on highs or lows the necessary correction can be effected.) During the intended use of our device running the indicator around the shaft in the vicinity of the nock is a most exacting way to learn and bring about the necessary changes.

FIG. 4 is an enlargement of the nock/broadhead support. The support is routinely rotated into position for nock/broadhead alignment by one of the aforementioned options. The head or the nock is positioned in the reducer bushing, 17, or the inner race of bearing, 18 snuggly to prevent play during rotation and alignment.

A reducer bushing, 17, is used where the bearing ID does not provide a small enough diameter to facilitate smaller OD nocks. Some might choose to use different bearing block assemblies, 21 and 18 using two different bearing inside diameters, ID's.

This assembly is pivotal in the disclosure. For it provides a support for any size arrow, nock or broadhead configuration. It along with the two support bearings on the other end and the indicator makes possible the assembly and/or conditioning of any arrow/set combination without the need for presetting or the like.

FIG. 5 illustrates the arrow straightening device with an arrow in position for nock indicating/alignment. Here the mode and the means of affixing any size nock or broadhead configuration to any arrow diameter becomes apparent. Heretofore the only device for attaching broadheads or nocks was a non-indicator device featuring different supports aligning only two bladed broadheads off a preset tool device. The means presented in this disclosure is certainly novel and state of the art.

In FIG. 5 the indicator support, 3, is slid, by loosening, sliding, and resecuring thumbscrew, 16, so that the indicator follower, 20, is located almost adjacent to the nock. With the nock pressed firmly against the inner bearing race in bearing support, 21, the arrow can be rotated 360° again and again by way of rotating pressure on the arrow at the right end bearings, 9.

While the nock is still tacky, alignment pressure can be applied to the high side through the indicator follower, 20. Repeating rotation and pressure may result in almost perfect alignment. Typical indicator accuracy would be better than 0.0005". Arrows aligned within 0.002" TIR (Total Indicator Readout) shoot quite accurately and within acceptable limits. Straightening any broadhead type in this approximate position will require some heat to the hot melt glue insert to soften the glue as discussed earlier. Care should be exercised while heating to prevent aluminum degradation. Light heating of the glue will soften it and make straightening possible. Note that any number of configuration of blades is possible. Any number of blades will fall concentric in the bearing inside diameter. Odd numbers of blades in modern broadheads are desirable because they are less apt to plane. Planing is a term used to describe the curved flight an arrow takes when the flight may be effected by an even number of blades. This may in part be due to less than adequate helical fletching of the feathers or vanes. The two bladed arrow will have to be about twice as wide to produce the cutting equivalent of a 4 bladed type. Wide, even number bladed arrows are notorious planers. Five blades reduce the width even farther and certainly break up the tendency to plane because of the unsympathetic positions of the blades all 72° apart. To straighten, simply insert an assembled broadhead into the support bearing and rotate as described in the nock discussion. Note again the adaptability of the device to arrow diameters and nock/head diameters.

At this point it should be noted that the pressure bar, 12, is not generally used in nock or broadhead pressure. The indicator follower, 20, is used to provide the pressure. The arm, 12, is typically too wide and awkward for this function. Especially while straightening nocks where the feathers or vanes may be positioned close to the nock leaving too little room for the bar.

What we claim is:

1. An arrow straightening apparatus comprising a base, arrow shaft support means adjustably mounted on said base, and indicator means adjustably mounted on said base for determining any eccentricity or radial irregularity in said arrow shaft, the improvement comprising an attachment for rotatably supporting nocks or heads for placement on said shafts in aligned relationship.

2. An apparatus as in claim 1 wherein said attachment comprises a cylindrical bearing means into which said nocks or heads are received.

3. An apparatus as in claim 1 wherein said attachment is provided with means to mount it on said arrow shaft support means.

4. An apparatus as in claim 1 wherein said base comprises an elongated member provided with a dovetail guide means adapted to slidably receive said arrow shaft support means and said indicator means, each of which are mounted on members having a complimentary dovetail profile.

5. An apparatus as in claim 1 wherein said arrow shaft support means comprises a pair of bearings rotatably mounted on a support block.

6. An apparatus as claim 1 wherein said indicator means is mounted on a shaft straightening mechanism which comprises a support block slidably mounted on said base, an upstanding support post, indicator support bracket means and a bending bar means.

7. An apparatus as in claim 6 wherein said bending bar means is pivotably secured on said support post and said indicator support bracket is slidably disposed on said post.

8. An apparatus as in claim 6 wherein said bending bar means includes a force bushing adapted to engage the arrow shaft to straighten the same.

9. An apparatus as in claim 7 wherein said bending bar means includes spring means to bias it upwardly.

10. A method for using an arrow straightening device to align nocks or heads on arrow shafts, said device comprising a base, arrow shaft support means adjustably mounted on said base, and indicator means adjustably mounted on said base wherein said indicator is shifted to a position along said base to be located outboard of said arrow shaft support means in order to align a nock or head while on said arrow such that any eccentricity or irregularity between said nock or head and said shaft may be detected and proper alignment maintained during attachment of said nock or head and the arrow shaft.

11. A method for adhesively bonding a nock or head to the shaft of an arrow which comprises mounting a nock or head on a first support means for rotation, mounting said arrow shaft on a second support means for rotation, joining said nock or head and said arrow shaft with an unset adhesive therebetween, rotating said joined nock or head and shaft, while rotated, positioning an indicator to detect any misalignment and correcting any said misalignment before said adhesive sets to permanently bond said nock or head and said arrow shaft.

12. A method as in claim 11 wherein the adhesive is of the hot-melt type and heat is applied in order to soften the same to adjust the head or nock while on the shaft to correct any misalignment.

* * * * *